A. HACKMAN & G. W. TINSLEY.
Nut-Lock.

No. 225,121.   Patented Mar. 2, 1880.

WITNESSES:
A. Schehl.
C. Sedgwick

INVENTOR:
A. Hackman,
G. W. Tinsley
BY Munn & Co
ATTORNEYS.

UNITED STATES PATENT OFFICE.

AMANDES HACKMAN AND GEORGE W. TINSLEY, OF BLAKESBURG, IOWA.

NUT-LOCK.

SPECIFICATION forming part of Letters Patent No. 225,121, dated March 2, 1880.

Application filed December 3, 1879.

*To all whom it may concern:*

Be it known that we, AMANDES HACKMAN and GEORGE W. TINSLEY, of Blakesburg, in the county of Wapello and State of Iowa, have invented a new and Improved Nut-Lock, of which the following is a specification.

Figure 4:
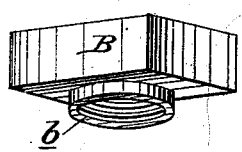
Figure 1:
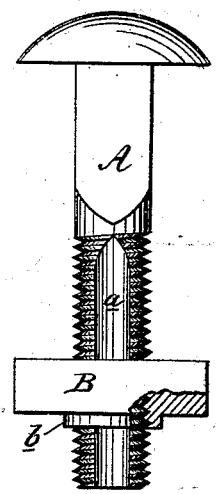
Figure 5:
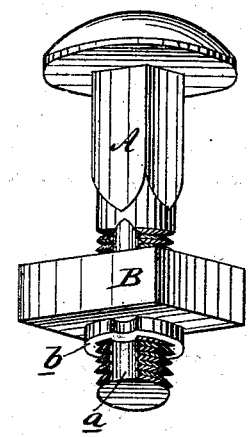
Figure 2:
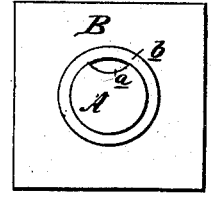
Figure 3:
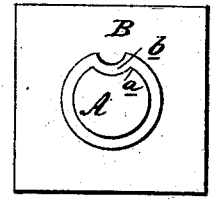

Figure 1 is a vertical elevation, partly in section, of the bolt and nut. Fig. 2 is an end view of the same with the nut unlocked. Fig. 3 is an end view of the same, showing the nut locked. Fig. 4 is a perspective view of the nut. Fig. 5 is a perspective view, showing the nut locked by the pressure of the collar into the groove of the bolt.

Similar letters of reference indicate corresponding parts.

This invention belongs to that class of nut-locking devices in which unusual shape is given to both nut and bolt.

The invention consists of a bolt having a longitudinal groove cut across its screw-threads, in combination with a nut having a thin raised annular collar or flange, that fits about the bolt and may be pressed into the groove of the bolt for the purpose of locking.

In the drawings, A represents the screw-bolt, having the groove $a$ cut in it across its screw-threads. B is a nut, having a thin raised collar or flange, $b$, that fits closely about the said bolt A. The nut B is locked or secured on the bolt A by bending the collar or flange $b$ into the groove $a$, and the nut may be loosened at any time by bending the flange or collar $b$ out of the said groove $a$. This nut B can be manufactured and sold to be used on any screw-bolt, a simple depression made in the screw of a bolt being sufficient for locking the collar $b$ into.

Having thus described our invention, we claim as new and desire to secure by Letters Patent—

1. As an improved article of manufacture, the nut B, constructed as herein described, with an annular yielding collar or flange, $b$, substantially as herein shown, which collar may be pressed into a groove or depression on a screw-bolt for the purpose of locking the nut.

2. In combination with a screw-bolt, A, provided with a groove or depression, $a$, on its screw-thread, a screw-nut, B, having a yielding collar or flange, $b$, substantially as herein shown and described.

AMANDES HACKMAN.
GEORGE W. TINSLEY.

Witnesses:
WM. FRITZ,
CHARLES G. WINN.